(12) United States Patent
Yan et al.

(10) Patent No.: US 6,413,651 B1
(45) Date of Patent: Jul. 2, 2002

(54) COMPOSITE METAL COIL OR PLATE AND ITS MANUFACTURING METHOD

(76) Inventors: Mengjie Yan; Qinglian Meng, both of Lot 33, Gebeng Industrial Estate, Kuantan, Pahang Darul Makmur (MY)

( * ) Notice: Subject to any disclaimer, the term of this patent is extended or adjusted under 35 U.S.C. 154(b) by 0 days.

(21) Appl. No.: 09/402,522

(22) PCT Filed: Jul. 20, 1999

(86) PCT No.: PCT/CN99/00093

§ 371 (c)(1),
(2), (4) Date: Oct. 5, 1999

(87) PCT Pub. No.: WO01/05585

PCT Pub. Date: Jan. 25, 2001

(51) Int. Cl.⁷ ............................ B32B 15/01; B21B 1/38; B23K 20/04
(52) U.S. Cl. ...................... 428/592; 428/660; 428/674; 428/685; 420/477; 228/194; 228/245; 228/246
(58) Field of Search ................................. 428/592, 685, 428/660, 674; 420/477; 228/194, 245, 246, 56.3

(56) References Cited

FOREIGN PATENT DOCUMENTS

| CN | 94107353.X | 1/1996 |
|---|---|---|
| CN | 94108027.7 | 2/1996 |
| JP | 58-212884 | 12/1983 |

*Primary Examiner*—Deborah Jones
*Assistant Examiner*—Jason Savage
(74) *Attorney, Agent, or Firm*—Douglas D. Zhang

(57) ABSTRACT

A kind of composite metal coil/plate includes one parent metal coil/plate and at least one clad metal coil/plate as well as an interlayer composed of atoms of a brazing filler, the parent metal and the clad metal. The interlayer is about 2–10 μm in thickness. The present invention also relates to a method of manufacturing composite metal coil/plate. The method comprises pre-cladding the parent and clad metal coils/plates as well as the brazing filler foil in an inert or reductive atmosphere at 850–1000° C., and hot rolling cladding the same under inert or reductive atmosphere at 900–1050° C. A composite metal plate is obtained after cooling.

4 Claims, 1 Drawing Sheet

COMPOSITE METAL COIL OR PLATE AND ITS MANUFACTURING METHOD

FIELD OF THE INVENTION

The present invention relates to a kind of composite metal coil or plate and its manufacturing method.

BACKGROUND OF THE INVENTION

Composite metal plates, such as those consisting of plain carbon steel plates composed or clad with stainless steel plates, copper plates or titanium plates, have been widely used. Composite metal plates are used mainly because they are economical, resource-saving and can be used as special materials for equipment. For example, a stainless steel plate is more suitable for manufacturing anti-corrosive pressure vessels, but it costs too much. If a composite metal plate made of plain carbon steel plate and a stainless steel plate is used to make the same pressure vessels, the stainless steel plate will only constitute 2~10% of the whole composite metal plate in thickness. Thus, the production cost is dramatically reduced while a high anti-corrosion capacity with sufficient strength is maintained. In addition, since heat-resisting, anti-corrosion and conductive materials such as copper, nickel and chromium are expensive and scarce, it will be a quite resource saving if composite metals of double or triple plates are used.

There are two main methods of manufacturing composite metal plates today: explosion cladding and hot-rolling cladding. Both methods have common as well as respective limitations.

1. Neither method is suitable for continuous production. Only single piece or unit production is possible. Hence the productivity is very low.
2. Since the size of the composite area is limited by either method, only composite materials and composite spare parts can be produced. That means higher production costs.
3. A number of factors can affect the explosion cladding. They include the type and amount of explosives used, the gap and angle between the clad plate and the parent plate, the buffer materials used, etc. As a result, yield of the finished products is very low.

When performing explosion cladding, a parent plate is placed on a flat and firm working anvil, and a clad plate is placed on the parent plate at a certain angle. After that, explosive is put on the clad plate, which explodes and gives the clad plate an extremely powerfull impact force to collide with the parent plate. The collision energy is large enough to form metallurgical combination, namely inter-atomic combination at interfaces of the two plates, thereby forming a composite material with a certain degree of shearing strength. The advantage of explosion cladding is that it can produce composite materials in various shapes, such as clad slabs, clad capped ends, clad pipes, etc.

Hot-rolling cladding is to properly flatten by machines the cladding surfaces of the parent plate and the clad plate, keep those surfaces clean, then place the surfaces of the two plats face to face, and superimpose those with periphery welded and vacuumized. After that, the interfaces of the plates to be clad are sealed to avoid oxidation. Thereafter, put the two superimposed plates into a heating furnace for heating (1200° C.). After keeping the plates at a constant temporary for a certain period of time, hot-roll the plates. The rolling force (reduction force) is about several thousand tons and the reduction ratio per roll is over 45%~55%. The rolling force (reduction force) is determined by the thickness of the parent plate, the clad plate and the finished composite plate. The power of a hot-rolling mill is above ten thousand KW. Therefore, the investment and equipment manufacturing costs are very high, which increases the product prices. As a result, this method can only be used in some special sectors and is impossible to be used in civil and other common sectors. After hot rolling, the superimposed plates become the required composite material.

Japanese Patent JP58-212884 provides a method of manufacturing a narrow (<300 mm in width) strip from an aluminum strip and a stainless steel strip at a low temperature with large reduction. By this method, two different materials or strips, after uncoiling, are preheated to a certain temperature (200° C.) by heating rollers, and then are sent to a rolling mill for rolling cladding. The parent plate/strip and the clad plate/strip may be continuously clad into a composite metal plate or strip. Before the plates or strips to be clad reach the roller gap, they are heated to diffusion temperature, making diffusion occur at the roller gap or at the moment the plates or strips leave the roller gap. There is certain rolling deformation of the plates or strips during rolling cladding. By this method, composite strips with certain combined strength can be obtained. Nevertheless, this method is not perfect. Due to the preheating temperature, only diffuision combination, instead of metal-lurgical combination, can be obtained by this method. Macroscopically, the surfaces to be clad look smooth after cleaning, but microscopically there are numerous concaves and convexes. In contrast with the previously mentioned hot-rolling cladding method, the latter's heating temperature is rather low (below 300° C.) and reduction is much smaller. Hence, many micro-areas (micro-zones) on the surfaces to be clad are not perfectly bonded or composed during cladding, and it is quite difficult for atoms to inter-diffuse. Under this condition, those micro-areas cannot be well clad, which results in unclad areas in those micro-areas (microzone). As a result, the composed or composite strength is poor.

OBJECT OF THE INVENTION

The object of the present invention is to provide a high quality, well-clad composite metal coil or plate with improved combining or composite strength and without the usual unclad areas.

Another object of the present invention is to present a method of manufacturing composite metal coils or plates. This method provides better cladding, eliminates the unclad areas between the clad coil/plate and the parent coil/plate, and improves the composed or composite strength (over 280 Mpa).

SUMMARY OF THE INVENTION

The present invention provides a kind of composite metal coil or plate which includes one parent metal coil or plate, at least one clad metal coil or plate, and an interlayer composed of atoms of a brazing filler, the parent coil or plate and the clad coil or plate. The interlayer is about 2~10 μm in thickness.

The present invention also provides a method of manufacturing composite metal coils or plates, which includes the following steps:

(1) Clean, polish and dry or bake the surfaces of a parent metal coil or plate and a clad metal coil or plate that are to be clad; put a brazing filler foil between the said surfaces to be clad and superimpose the parent and clad metal coils or plates;

(2) Put the said superimposed parent and clad metal coils or plates as well as the brazing filler foil specified in step (1) into protective inert or reductive atmosphere at 850–1000° C. for pre-cladding;

(3) After pre-cladding, hot-rolling clad the superimposed metal coils or plates at 900–1050° C. in an inert or reductive atmosphere. A composite metal coil or plate is obtained after cooling.

DETAIL DESCRIPTION OF THE INVENTION

Figure 1:
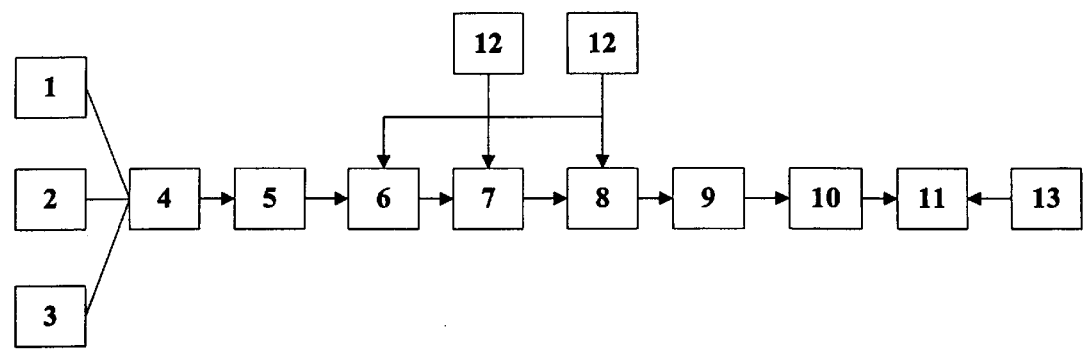
FIG. 1 is the process flow chart of the present invention for manufacturing composite metal coils, and wherein the numeral 1 refers to stainless steel coil 23 and uncoiler, 2 refers to brazing filler foil 22 and uncoiler, 3 refers to carbon steel coil 21 and uncoiler, 4 refers to horizontal supporting rollers, 5 refers to vertical rollers, 6 refers to inert gas generator, 7 refers to hot rolling mill, 8 refers to cooling bed, 9 refers to tension device, 10 refers to pulling device, 11 refers to coiler for the composite metal coil, 12 refers to inert gas generator, and 13 refers to paper roll which is used to prevent scratch on the surfaces of the stainless steel.

One aspect of the present invention is to provide a kind of composite metal coil or plate which includes one parent metal coil or plate and at least one clad metal coil or plate, and an interlayer composed of atoms of a brazing filler, the parent metal coil or plate and the clad metal coil or plate. The said interlayer is about 2–10 $\mu$m in thickness.

For composite metal coils or plates obtained in accordance with the present invention, the said parent metal coils or plates are carbon steel coils/plates; the said clad metal coils or plates are stainless steel coils or plates, copper coils or plates or titanium coils or plates.

For the composite metal coil of this invention, the parent metal coil is preferred to be 2–8 mm in thickness, and the clad metal coil is preferred to be 0.3–2 mm in thickness. For the composite metal plate of this invention, there are no restrictions as to the thickness of the parent metal plate and the clad metal plate.

For the composite metal coil/plate of this invention, the chemical composition of the interlayer is as follows (wt %): Ni 4–13%, Zn 15–33%, Sn 3–10%, Mn 2–4%, P 0.1–2%, Si 0.1–0.4%, Ag 1–2%, C 0.002–0.003%, Fe 10–15%, and residue is Cu.

Another aspect of the present invention is to provide a method of manufacturing composite metal coils/plates, which consists of the following steps:

(1) Clean, polish and dry or bake the surfaces of parent metal coil/plate and the clad metal coil/plate that are to be clad; put a brazing filler foil between the said surfaces and then have them superimposed;

(2) Put the said superimposed parent and clad metal coils/plates inserted with the brazing filler foil in between, which are obtained through the step (1), into a protective inert or reductive atmosphere at 850–1000° C. for pre-cladding;

(3) After pre-cladding, hot-rolling clad the superimposed metal coils/plates at 900–1050° C. in an inert or reductive atmosphere. A composite metal coil/plate is obtained after cooling.

As per the method of the present invention, the said pre-cladding time is 3~60 minutes, preferably 5~30 minutes. During pre-cladding, solid phase diffusion welding occurs mainly among the parent and clad metals and the brazing filler.

As per the method of the present invention, resistance heating, high frequency induction heating or gas heating is adopted for the said pre-cladding.

As per the method of the present invention, pre-pressing at the pressure of 20–100 Mpa is made at the same time as the said pre-cladding, in order to improve the combining strength of the parent and clad metal coils/plates.

As per the method of the present invention, the width of the said brazing filler foil is equal to that of the said coil or plate.

As per the method of the present invention, the chemical composition of the said brazing filler is as follows (wt %): Cu 42–55%, Ni 12–25%, Zn 15–33%, Sn 3–10%, Mn 2–4%, P 0.5–2%, Si 0.1–0.5%, and Ag 1–2%.

As per the method of the present invention, the said brazing filler foil is 20–40 $\mu$m in thickness.

As per the method of the present invention, the said parent metal coil/plate is a carbon steel coil/plate or an alloy steel coil/plate; the said clad metal coil/plate is a stainless steel coil/plate, copper coil/plate, or titanium coil/plate.

As per the method of the present invention, the pre-clad coils/plates are protected by inert gas during their transfer from a heating furnace to a rolling mill.

As per the method of the present invention, natural cooling is adopted after hot rolling.

As per the method of the present invention, a parent coil/plate, either a carbon steel coil/plate or an alloy steel coil/plate, and a clad coil/plate usually of special properties (e.g. a stainless steel plate/coil, a copper plate/coil, or a nickel-copper plate/coil) are heated and pre-clad in a protective atmosphere and then be hot rolled and clad to become a composite plate or a continuous composite coil. The said protective atmosphere contains inert gas or reductive gas or their mixtures, such as nitrogen, hydrogen or their mixture of 30% (Vol) hydrogen and 70% (Vol) nitrogen.

The said method can be used to manufacture composite metal coils or plates. When the method is used to manufacture composite metal coils, it works continuously. The specific steps are as follows: first, uncoil the parent coil and the clad coil, clean and dry or bake their surfaces to be clad, then place a brazing filler foil between the two surfaces that have been cleaned for cladding, the cleaning method being one of those commonly used in this field; then put the superimposed coils into a heating furnace protected by inert gas for pre-cladding at temperature of 800–1000° C.; finally, the pre-clad coils are hot rolled under a protective inert gas, with the two different coils clad or welded completely to form a composite metal coil.

Selection of the brazing filler is of great importance in manufacturing high-quality composite metal plates. Generally speaking, the selected brazing filler should satisfy the following requirements:

(1) Good wetness: to completely fill the gaps between the two surfaces or interfaces;

(2) Suitable melting point and fluidity: to facilitate atomic diffusion between the surfaces and guarantee tight combination of the two surfaces.

(3) Stable and homogeneous components: to prevent the filler from segregation which will cause intensive volatilization and giving off steams containing noxious or poisonous elements at high temperature during cladding.

(4) The mechanical and physical properties of the surfaces after cladding should meet the technical requirements of the overall composite coil or plate.

Furthermore, the adopted brazing filler should be capable of lowering cladding temperature, decreasing cladding pressure in the course of cladding, thereby improving the cladding quality.

Having undergone long-term and numerous experiments, the inventors of the present invention have come up with a kind of brazing filler that meets the above requirements. As per the method of the present invention, the chemical composition of the said brazing filler is as follows (wt %): Cu 42–55%, Ni 12–25%, Zn 15–33%, Sn 3–10%, Mn 2–4%, P 0.5–2%, Si 0.1–0.5%, and Ag 1–2%.

The purpose of placing a brazing filler between the parent and the clad coils or plates during cladding is to lower the melting point of the two interfaces or surfaces, to make the surfaces melt in the filler so as to guarantee direct contact of the parent coil/plate and the clad coil/plate and to increase the wetness between them. At high temperature, a brazing filler in solid state or molten state can lower the melting point of interfaces of the parent coil/plate and the clad coil/plate, activate the interfaces and speed up diffusion of atoms at interfaces, which means the atoms at the interfaces of the parent and clad coils/plates inter-diffuse and form an inter-atomic combination. Therefore, the combining strength of the clad or composite materials is greatly improved.

The brazing filler used in the present invention mainly contains copper and other elements: copper contributes to good wetness and fluidity of the brazing filler as well as higher anti-corrosion property of clad interfaces of the resulting composite coil/plate. The disadvantage is that the melting point of the brazing filler containing copper is a little bit high. To overcome this shortcoming, some alloying elements like phosphorus, zinc and silicon that can significantly lower the melting point are added to the brazing filler. The addition of these elements not only decreases the melting point of the brazing filler and increases its wetness, but also facilitates the atomic diffusion at the interfaces and speeds up the inter-diffusion between atoms of the clad interfaces, and subsequently obtains inter-atomic combination of the interfaces and greatly improves the combining strength of the interfaces.

The addition of nickel can markedly improve the combining strength of interfaces. But it also raises the melting point of the brazing filler. To control the rise of melting point, a small amount of silicon is added, which not only lowers the melting point of the brazing filler, but also betters the wetness, improves the spreading of the brazing filler at the interfaces and enhances the combining strength of the interfaces.

Aside from bringing down the melting point, tin and phosphor can improve the fluidity and combining strength of the brazing filler and lowers its brittleness.

The addition of a small amount of silver is to enhance the anti-corrosion property of the composite plates or coils. Meanwhile, silver can further decrease the ductility and wetness of the brazing filler, improve the combining strength and reduce brittleness.

Affected by the processing temperature and pressure, the components with lower melting point in the brazing filler will be decreased during the manufacturing of metal coils or plates of the present invention. Therefore, the components of the original brazing filler are somewhat different from those of the brazing filler in the composite coils or plates. In addition, the parent metal will be metallurgically combined with the clad metal at the work of the brazing filler. The interlayer of a composite metal coil or plate manufactured by the method of the present invention contains some elements from the parent metal and the clad metal besides those of the original brazing filler. More particularly, the chemical composition of original brazing filler is (wt %): Cu 42–55%, Ni 12–25%, Zn 15–33%, Sn 3–10%, Mn 2–4%, P 0.5–2%, Si 0.1–0.5%, and Ag 1–2%, while those of the interlayer of a composite metal coil or plate of the present invention are (wt %): Ni 4–13%, Zn 15–33%, Sn 3–10%, Mn 2–4%, P 0.1–2%, Si 0.1–0.4%, Ag 1–2%, C 0.002–0.003%, Fe 10–15%, and residue: Cu.

Common techniques can be used to make the brazing filler foils of the present invention.

Since the present invention uses the above-mentioned brazing filler and the special manufacturing techniques of the invention, an interlayer is formed among the parent coil/plate, the clad coil/plate and the said brazing filler, making a metallurgical combination thereof.

The process described in the present invention for manufacturing composite metal coils is explained below in conjunction with the attached drawing.

FIG. 1 is a drawing of the process flow of this invention for manufacturing composite metal coils. As shown in FIG. 1, a parent coil 21 and a clad coil 23 are uncoiled by uncoilers 1 and 3, respectively, the opposing surfaces of the coils to be clad are cleaned and polished to remove surface oil and oxides. Common cleaning and polishing methods may be used. Then, put the two polished coils in parallel into a dryer to be dried or baked to eliminate surface moisture and volatile. A brazing filler foil 22 is placed between the two cleaned and polished surfaces of parent coil 21 and clad coil 23 by means of an uncoiler 2. And then the parent coil 21, clad coil 23, and brazing filler foil 23 are compressed by compressing rollers 5, and be put into a sealed heating furnace 6 for pre-cladding. The pressure exerted by the compressing rollers 5 is 20 Mpa, and the gas in heating furnace 6 is inert gas or reductive gas. The heating temperature is 800–1000° C., and the heating duration is 3–60 minutes, preferably 5~30 minutes. Several heating methods such as resistance heating, high-frequency induction heating or gas heating may be used. The pre-clad parent coil and clad coil, which are preliminarily clad, are then sent into a hot rolling mill 7 for hot rolling cladding. The hot rolling mill is put in a sealed container filled with inert gas or reductive gas that ensures the hot rolling is performed under protective atmosphere. The incipient rolling temperature for hot rolling cladding is in the range of 900–1050° C. The pre-clad coils should still be under the protection of inert gas during the transfer from the heating furnace to the hot rolling mill. After hot rolling cladding, the composite plate or composite coil is sent into a cooling bed for natural cooling and become a finished composite coil after cooling.

The method of the present invention can also be used for manufacturing composite metal plates. The process is similar to that for manufacturing composite metal coils. However, no uncoiler is needed. Meanwhile, manufacture of composite metal plates is a semi-continuous process, compared with that of manufacture of composite metal coil. Therefore, metal plates can be pre-pressed by a static press such as a hydraulic press or other similar machines during or before pre-cladding.

For the said composite metal plate or composite metal coil of the present invention, the parent metal plate/coil is mainly carbon steel with certain strength and good ductility, including plain carbon steel and high-grade carbon steel such as #3 high-grade carbon steel (produced by China Baoshan Iron and Steels Works); and copper plate/coil, stainless steel plate/coil, or nickel-copper alloy plate/coil can be used as the clad metal plate/coil.

The composite metal plates or coils manufactured by using the method described in this invention are of high combining strength, firm combination, excellent mechanical properties at the combining surfaces and high shearing strength in particular. For example, when a #3 high-grade carbon steel (produced by China Baoshan Iron and Steel Works) is clad with a stainless steel, the shearing strength is equal or greater than 450 Mpa. In contrast with existing techniques, the present invention also has the following advantages:

(1) Greatly improves combining strength of composite materials.
(2) Is a simple production method with convenient application.
(3) Has wide applications, and can be used for cladding various metal materials.

BEST MODE TO IMPLEMENT THE PRESENT INVENTION

Further detailed explanations as to the present invention are given below in combination with embodiments. But it is to be understood that the present invention will by no means be limited to these embodiments.

Embodiment 1

Use a #3 high-grade carbon steel coil (3×500×30000 mm in size) (produced by China Baoshan Iron and Steel Works) as the parent coil 21, and a 1Cr18Ni9 stainless steel coil (0.3×500×30000 mm in size) as the clad coil 23.

Evenly mix Cu, Ni, Zn, Sn, Mn, P, Si and Ag in weight percentage of 43.00%, 17.00%, 30.00%, 5.00%, 2.50%, 1.00%, 0.30% and 1.20% respectively and smelt the mixture in a vacuum induction furnace. After smelting and molding, the mixture is rolled into a 0.025×500×30000 mm brazing filler foil by methods well known to people skilled in the art.

Uncoil the parent coil 21 and the clad coil 23 by uncoilers 1 and 3 respectively, and then clean the same by a cleaner or cleaners. The cleaned parent coil 21 and clad coil 23 are sent into a polisher or polishers, and the surfaces of the coils to be clad are polished to remove surface oil and oxides. The polished coils are sent in parallel into a dryer for drying or baking to eliminate surface moisture and volatile. Uncoil the brazing filler coil 22 manufactured with an uncoiler 2. Then put the brazing filler foil between the cleaned and polished surfaces of the parent coil 21 and the clad coil 23. The coils are then sent into a sealed heating furnace 6 for pre-cladding after being compressed by compressing rollers 5. The pressing force exerted by the compressing rollers 5 is 35 Mpa, and the gases in the heating furnace are 50% (vol) $H_2$ and 50% (vol) $N_2$. By resistance heating the temperature in the heating furnace 6 reaches 900° C. and holds for 6 minutes. The pre-clad coils are hot rolling clad by a hot rolling mill 7. The hot rolling mill is in a sealed container filled with protective gases of 50% (vol) $H_2$ and 50% (vol) $N_2$. The incipient rolling temperature of hot rolling cladding is 950° C. The pre-clad coils should still be under the protection of the said gases when being transferred from the heating furnace to the rolling mill. After hot rolling cladding, the composite coil is sent into a cooling bed for natural cooling and becomes a composite coil made of carbon steel coil and stainless steel coil after cooling.

The composite coil obtained is put to cold bending, shearing strength and other physical and mechanical tests according to the national standards. The results are shown in Table 3.

Inter-granular corrosion tests in accordance to GB1223-75 standards are carried out for the composite coil obtained. Two samples are taken from the composite coil obtained and then undergo sensitization treatment at 650° C. for 1 hour. The samples are treated by sulfuric acid—copper sulfate copper scrap corrosion, and undergo boiling for 24 hours. Then the surfaces to be examined are bent in an angle of 90°. No cracks are observed, which means the composite metal coil manufactured by the method of the present invention qualifies for anti-intergranular corrosion.

Embodiments 2–3

The same method adopted in Embodiment 1 is used here. Use a #3 high-grade carbon steel (produced by China Baoshan Iron and Steel Works) as the parent coil 21, but the composition of clad coil 23 and the brazing filler foil 22 and the sizes of coil 21 and coil 23 are different. The compositions of the brazing foil 22 are listed in Table 1, and the sizes of the clad coil 23 and parent coil 21, constitutions of the protective gases, heating temperature, pre-cladding time and hot rolling temperature are shown in Table 2. The composite coil obtained is put to cold bending, shearing strength and other physical and mechanical tests according to the national standards. The results are shown in Table 3.

TABLE 1

Chemical compositions of the brazing filler used in Embodiments 2–3 (wt %)

| Embodiment | Cu | Ni | Zn | Sn | Mn | P | Si | Ag |
|---|---|---|---|---|---|---|---|---|
| 2 | 52 | 16 | 17 | 9 | 3 | 1.5 | 0.3 | 1.2 |
| 3 | 45 | 22 | 20 | 5 | 5 | 1.1 | 0.4 | 1.5 |

TABLE 2

Technological parameters for Embodiments 2–3 to manufacture composite coils

| | Embodiment | |
|---|---|---|
| Item | 2 | 3 |
| Parent coil and its size mm | #3 high-grade carbon steel 8 × 500 × 20000 | #3 high-grade carbon steel 10 × 400 × 50000 |
| Clad coil and its size mm | 1Cr18Ni9 stainless steel 2 × 500 × 20000 | Copper coil 2 × 400 × 50000 |
| Size of brazing filler mm | 0.0007 × 500 × 20000 | 0.0006 × 400 × 50000 |
| Components of protective gases used for pre-combining and hot rolling % (vol) | $H_2$ 30 $N_2$ 70 | $H_2$ 65 $N_2$ 45 |

TABLE 2-continued

Technological parameters for Embodiments 2–3 to manufacture composite coils

| | Embodiment | |
|---|---|---|
| Item | 2 | 3 |
| Pre-cladding | | |
| Temperature, ° C. | 1050 | 900 |
| Duration min | 10 | 4 |
| Incipient rolling | 1000 | 860 |

TABLE 3

Mechaincal and physical properties of the composite coil

| | Embodinent | | |
|---|---|---|---|
| Property | 1 | 2 | 3 |
| Shearing strength | 500 | 490 | 475 |
| Cold bending property d = 2b | Sound | Sound | Sound |
| Bending angle 180° Intergradular corrosion | Qualified | Qualified | |
| Surface quality | Smooth and even | Smooth and even | Smooth and even |

INDUSTRIAL APPLICATIONS

The present invention can be widely applied in the fields of iron and steel making and metal materials manufacture, to clad different metal materials to form various composite materials with good physical and mechanical properties.

What is claimed is:

1. A composite metal coil/plate, comprising:
   a parent metal coil/plate;
   a clad metal coil/plate; and
   an interlayer between the parent metal coil/plate and the clad metal coil/plate, and wherein the interlayer is composed of atoms of a brazing filler, the parent metal coil/plate and the clad metal coil/plate, is 2~10 μm in thickness, and comprises:
   Ni in the amount ranging from about 4% to about 13% by weight;
   Zn in the amount ranging from about 15% to about 33% by weight;
   Sn in the amount ranging from about 3% to about 10% by weight;
   Mn in the amount ranging from about 2% to about 4% by weight;
   P in the amount ranging from about 0.1% to about 2% by weight;
   Si in the amount ranging from about 0.1% to about 0.4% by weight;
   Ag in the amount ranging from about 1% to about 2% by weight;
   C in the amount ranging from about 0.002% to about 0.003% by weight;
   Fe in the amount ranging from about 10% to about 15% by weight; and residue Cu.

2. A composite metal coil/plate as claimed in claim 1, wherein the parent metal coil/plate is a carbon steel coil/plate, and the clad metal coil/plate is selected from the group consisting of a stainless steel coil/plate, a copper coil/plate and a titanium coil/plate.

3. A composite metal coil/plate as claimed in claim 1, wherein the parent metal coil/plate is an alloy steel coil/plate, and the clad metal coil/plate is selected from the group consisting of a stainless steel coil/plate, a copper coil/plate and a titanium coil/plate.

4. A composite metal coil/plate manufactured according to a method comprising (a) cleaning, polishing and drying a surface of a parent metal coil/plate that is to be clad; (b) cleaning, polishing and drying a surface of a clad metal coil/plate that is to be clad; (c) placing a brazing filler foil between the parent metal coil/plate and the clad metal coil/plate with the polished surfaces of the parent metal coil/plate and the clad metal coil/plate facing each other; (d) superimposing the parent metal coil/plate, the brazing filler coil and the clad metal coil/plate to form superimposed coils/plates; (e) pressing the superimposed coils/plates under a pressure ranging from 20 Mpa to 100 Mpa; (f) pre-cladding the superimposed coils/plates in a protective atmosphere at 800~1000° C.; and (g) hot-rolling cladding the superimposed coils/plates in a protective atmosphere at 900~1050° C. to form a composite metal coil/plate; which has an interlayer comprising:
   Ni in the amount ranging from about 4% to about 13% by weight;
   Zn in the amount ranging from about 15% to about 33% by weight;
   Sn in the amount ranging from about 3% to about 10% by weight;
   Mn in the amount ranging from about 2% to about 4% by weight;
   P in the amount ranging from about 0.1% to about 2% by weight;
   Si in the amount ranging from about 0.1% to about 0.4% by weight;
   Ag in the amount ranging from about 1% to about 2% by weight;
   C in the amount ranging from about 0.002% to about 0.003% by weight;
   Fe in the amount ranging from about 10% to about 15% by weight; and residue Cu.

* * * * *